(12) United States Patent
Falik et al.

(10) Patent No.: US 7,177,782 B2
(45) Date of Patent: Feb. 13, 2007

(54) METHODS AND ARRANGEMENTS FOR CAPTURING RUNTIME INFORMATION

(75) Inventors: Ohad Falik, Kfar Saba (IL); Joseph Wayne Freeman, Raleigh, NC (US); Isaac Karpel, Cary, NC (US); James S. Rutledge, Durham, NC (US); Randall Scott Springfield, Chapel Hill, NC (US)

(73) Assignee: Lenovo (Singapore) Pte. Ltd. (SG)

( * ) Notice: Subject to any disclaimer, the term of this patent is extended or adjusted under 35 U.S.C. 154(b) by 0 days.

(21) Appl. No.: 10/871,848

(22) Filed: Jun. 18, 2004

(65) Prior Publication Data

US 2005/0283343 A1  Dec. 22, 2005

(51) Int. Cl.
*G06F 15/00* (2006.01)
*G06F 12/00* (2006.01)

(52) U.S. Cl. .................... 702/189; 711/100

(58) Field of Classification Search ........... 702/189; 711/100, 129, 162, 202, 167; 713/323; 365/185.33
See application file for complete search history.

(56) References Cited

U.S. PATENT DOCUMENTS

| | | | |
|---|---|---|---|
| 4,800,533 A | 1/1989 | Arakawa | |
| 4,965,828 A | 10/1990 | Ergott | |
| 5,058,074 A | 10/1991 | Sakamoto | |
| 5,197,026 A | 3/1993 | Butler | |
| 5,412,612 A | 5/1995 | Oyama | |
| 5,438,549 A | 8/1995 | Levy | |
| 5,488,711 A | 1/1996 | Hewitt | |
| 5,530,828 A | 6/1996 | Kaki | |
| 5,535,328 A * | 7/1996 | Harari et al. | 714/7 |
| 5,560,023 A * | 9/1996 | Crump et al. | 713/323 |
| 5,701,516 A * | 12/1997 | Cheng et al. | 710/22 |
| 5,798,961 A * | 8/1998 | Heyden et al. | 365/52 |
| 6,145,068 A * | 11/2000 | Lewis | 711/170 |
| 6,393,584 B1 * | 5/2002 | McLaren et al. | 714/14 |
| 6,418,506 B1 | 7/2002 | Pashley | |
| 6,484,270 B1 | 11/2002 | Odani | |

(Continued)

OTHER PUBLICATIONS

Ohmura et al., Device State Recovery in Non-Volatile Main Memory Systems, 2003 IEEE, Proceedings of the 27th Annual International Computer Software and Applications Conference (COMPSAC 2003).*

(Continued)

*Primary Examiner*—Bryan Bui
*Assistant Examiner*—Toan M. Le
(74) *Attorney, Agent, or Firm*—Schubert Osterrieder & Nickelson PLLC

(57) ABSTRACT

Methods and arrangements for capturing information related to operational conditions are disclosed. Embodiments include volatile memory to quickly record operational parameters via, e.g., basic input output system (BIOS) code, system management interrupt (SMI) code and/or executing applications. Many embodiments provide an alternative power source and a voltage switch to protect against loss of the information between storage in the volatile memory and storage in the non-volatile memory. Some embodiments include a read controller that provides access to the volatile memory when primary power is available. The read controller may also offer direct access to the non-volatile memory in case of a catastrophic failure that renders the processing device substantially non-functional. Further embodiments include a second processing device to generate a usage model and/or to perform diagnostics with the operational parameters.

26 Claims, 6 Drawing Sheets

U.S. PATENT DOCUMENTS

| | | | |
|---|---|---|---|
| 6,654,848 B1 * | 11/2003 | Cleveland et al. | 711/103 |
| 6,751,155 B2 * | 6/2004 | Gorobets | 365/230.09 |
| 6,799,244 B2 * | 9/2004 | Tanaka et al. | 711/113 |
| 6,845,046 B1 * | 1/2005 | Ishikawa et al. | 365/185.33 |
| 6,898,662 B2 * | 5/2005 | Gorobets | 711/103 |
| 7,100,058 B1 * | 8/2006 | Tomlinson et al. | 713/300 |
| 2002/0023177 A1 * | 2/2002 | Dobbek | 709/321 |
| 2003/0165076 A1 * | 9/2003 | Gorobets et al. | 365/200 |
| 2005/0235131 A1 * | 10/2005 | Ware | 711/203 |

OTHER PUBLICATIONS

, "Adaptive Data Update Method to Non Volatile Memory", IP.com Prior Art Database (https://priorart.ip.com) (document No. IPCOM000016459D) (Jun. 23, 2003 UTC) (disclosed by IBM) (Main web page http://www.ip.com).

* cited by examiner

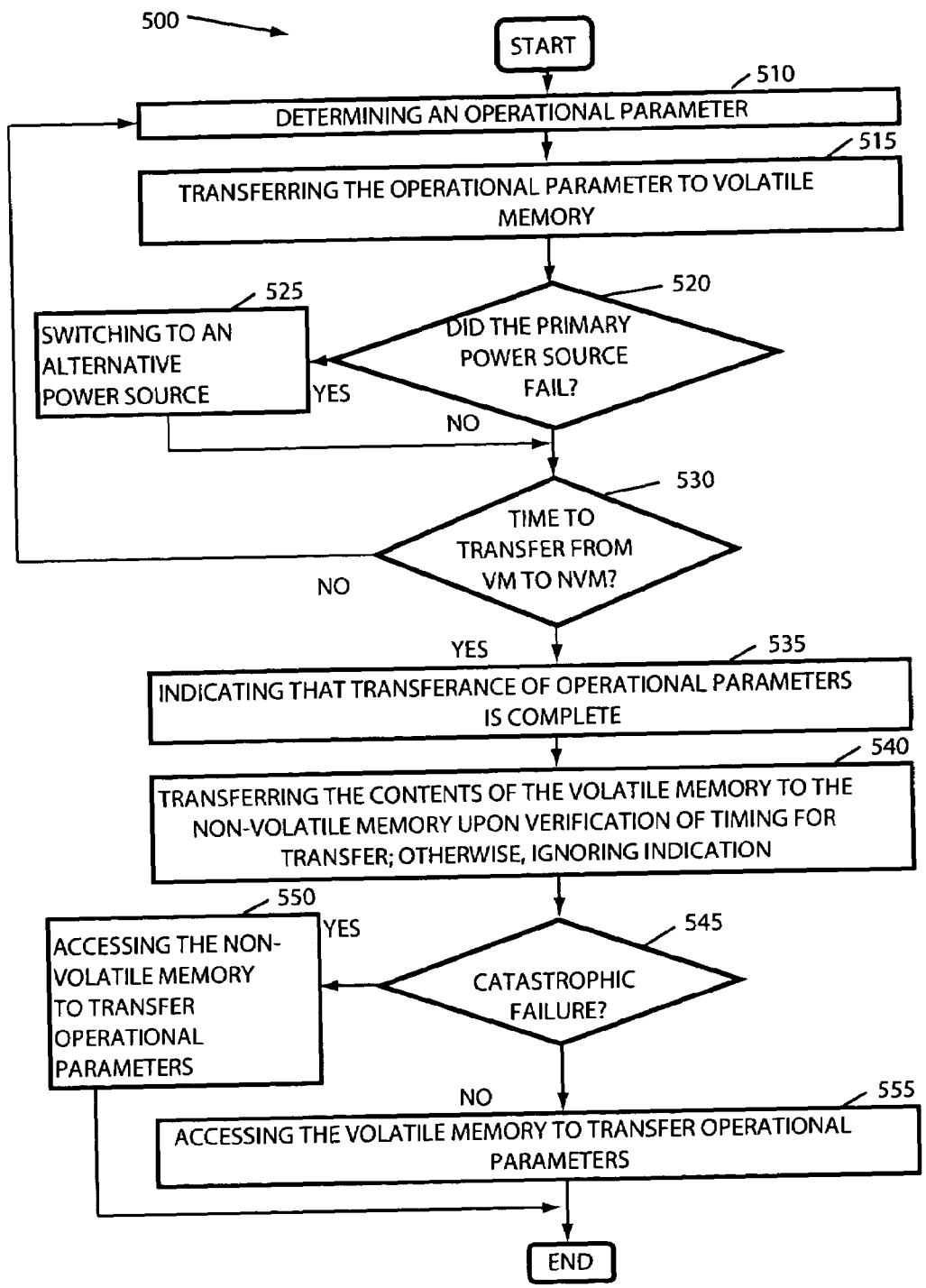

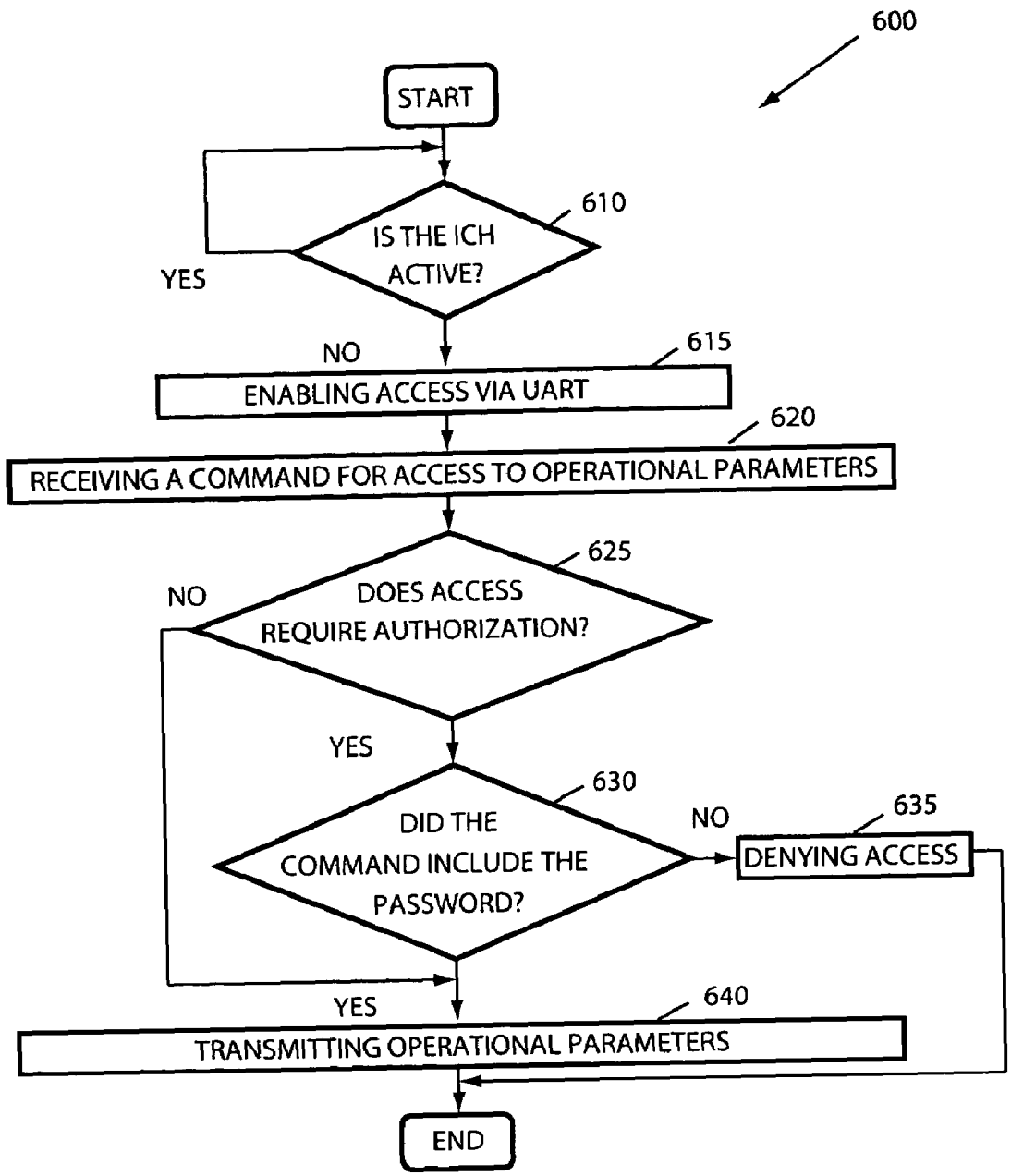

METHODS AND ARRANGEMENTS FOR CAPTURING RUNTIME INFORMATION

FIELD OF INVENTION

The present invention is in the field of computer systems. More particularly, the present invention relates to methods and arrangements for capturing runtime information during system boot and operation such as measurements of environmental conditions, number of operation hours, replacement of some system elements, average and out of range voltage readings etc., to, e.g., generate customer usage models and/or diagnose system failures.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

The widespread use of PCs to various segments of society has resulted in a reliance on the PCs for work, e.g., telecommuting, news, stock market information and trading, banking, shopping, shipping, communication in the form of Voice Internet protocol (VoiceIP) and email, as well as other services. In fact, for many PCs represent an essential tool for their livelihood. Thus, it is desirable to minimize loss of productivity by increasing the reliability of and reducing the downtime of PCs.

Unfortunately, the proliferation of PCs has been accompanied with a proliferation of quality issues related to early life failures for the PCs. Many of these failures appear to be induced by various operational parameters including operation of the PCs in environments that are not within specified environmental conditions, faulty capacitors, failing hard disk drives (HDDs), and etc. Moreover, although technicians try to obtain as much information about the operational parameters leading up to the failures as possible, the information currently being gathered is not reliable. Determinations with regard to early life failures, for instance, must be diagnosed after the failure based upon the physical characteristics of the failed PC and customer renditions of occurrences leading up to the failure. Accurate information related to the operation may be undeterminable. For instance, a component may appear to have failed as a result of a failure to dissipate sufficient heat. The failure may arise from an excessively high ambient temperature, a high voltage outside the specified operating guidelines, a power surge, a lack of proper ventilation, low fan performance, a fan failure, a blockage in one or more ventilation paths, or some combination thereof.

In the case of catastrophic failures of PCs, forensic analyses may offer information with regard to the states of one or more components in the area of the failed component(s). However, forensic analyses are very expensive and may still fail to provide a clear indication of the specific problem that led to the failure of the PC. For example, a voltage supply may supply a lower than specified voltage for the fan as a result of an unusual fluctuation in the voltage supplied to the power supply, reducing airflow throughout a PC such as a desktop computer. In addition, a stack of papers placed on the desk, next to the desktop computer may block an exit for air and the combination of the blockage and the reduced airflow changes circulation patterns within the computer, resulting in a lack of airflow in the area of the failed component. The component and other local components are then unable to dissipate the amount of heat that operations produce, resulting in an uncontrolled heat buildup. And the most susceptible component fails in response to the resulting heat buildup. The resulting heat build up in components near the blocked vent, if detectable, may not sufficiently identify the blockage as the primary cause of the failure, especially when the technician does not have the opportunity to survey the office.

In fact, customers are demanding real-time debug of problems with personal computing devices, many of which are related to software conflicts rather than failed components, so technicians typically begin diagnostics over the phone without any physical review of the personal computing device. Technical support by telephone relies heavily on the analytical expertise of the technicians and the knowledge of the user about the problem. The technicians have no knowledge regarding the usage of the personal computing device so they may gather information from the user about the usage and/or request that the user perform a number of standard testing procedures that could identify the problem.

The customer may provide useful information with regard to the operating environment and conditions at the time and possibly for a period of time before the failure of the PC. And, in some cases, the customer may be able to repeat steps that lead to the failure. For instance, the personal computing device may provide indications of problems or errors such as a failed read or write to a hard drive or memory address, a failed thread, a processing error, etc. while the customer is using the personal computing device. The customer may then be able to relate events leading up the failure of the personal computing device, allowing for a little more accurate of a determination of the cause of the failure. However, when the errors occur in quick succession and/or the customer is not diligent or sufficiently descriptive with regard to recording the errors, the information may be incomplete and possibly incorrect.

There is, therefore, a need for a cost-effective system to capture information that accurately describes operational parameters (power on hours, temperature data, fan performance, etc.) even in the worst cases and store the operational parameters in a robust memory that may survive early life failures. There is an even greater need for such systems when they offer fast access to the robust memory to avoid slowing down the PC.

SUMMARY OF THE INVENTION

The problems identified above are in large part addressed by methods and arrangements for capturing operational parameters of a processing device. One embodiment provides an apparatus. The apparatus contemplates a non-volatile memory buffer to store the operational parameters; a volatile memory buffer coupled with the non-volatile memory buffer to increase capture speed for the operational parameters; and a non-volatile memory controller coupled with the volatile memory buffer to transfer the operation parameters from the volatile memory buffer to the non-volatile memory buffer.

Another embodiment provides a processing device. The processing device contemplates a non-volatile memory device to store the operational parameters; a volatile memory device to receive the operational parameters and maintain the parameters for storage in the non-volatile memory device; a parameter controller to transfer the operational parameters to the volatile memory device and to instigate a transfer of the operational parameters from the volatile memory device to the non-volatile memory device; and a read controller coupled with the non-volatile memory device to transfer the operational parameters from the processing device.

Another embodiment provides a method for capturing operational parameters of a processing device. The method generally includes determining one or more operational parameters, the operational parameter(s) being related to usage of the processing device; transferring the operational parameter(s) to a volatile memory; maintaining a power source for the volatile memory by switching to an alternative power source in response to a failure of a primary power source; generating a signal to indicate that the operational parameter(s) are stored in the volatile memory; and transferring the operational parameter(s) from the volatile memory into a non-volatile memory in response to the signal.

BRIEF DESCRIPTION OF THE DRAWINGS

Other objects and advantages of the invention will become apparent upon reading the following detailed description and upon reference to the accompanying drawings in which, like references may indicate similar elements:

FIG. 5 depicts an example of a flow chart for capturing runtime information; and FIG. 6 depicts an example of a flow chart for accessing operational parameters in a personal computing device such as the desktop computer of FIG. 1.

DETAILED DESCRIPTION OF EMBODIMENTS

Figure 1:
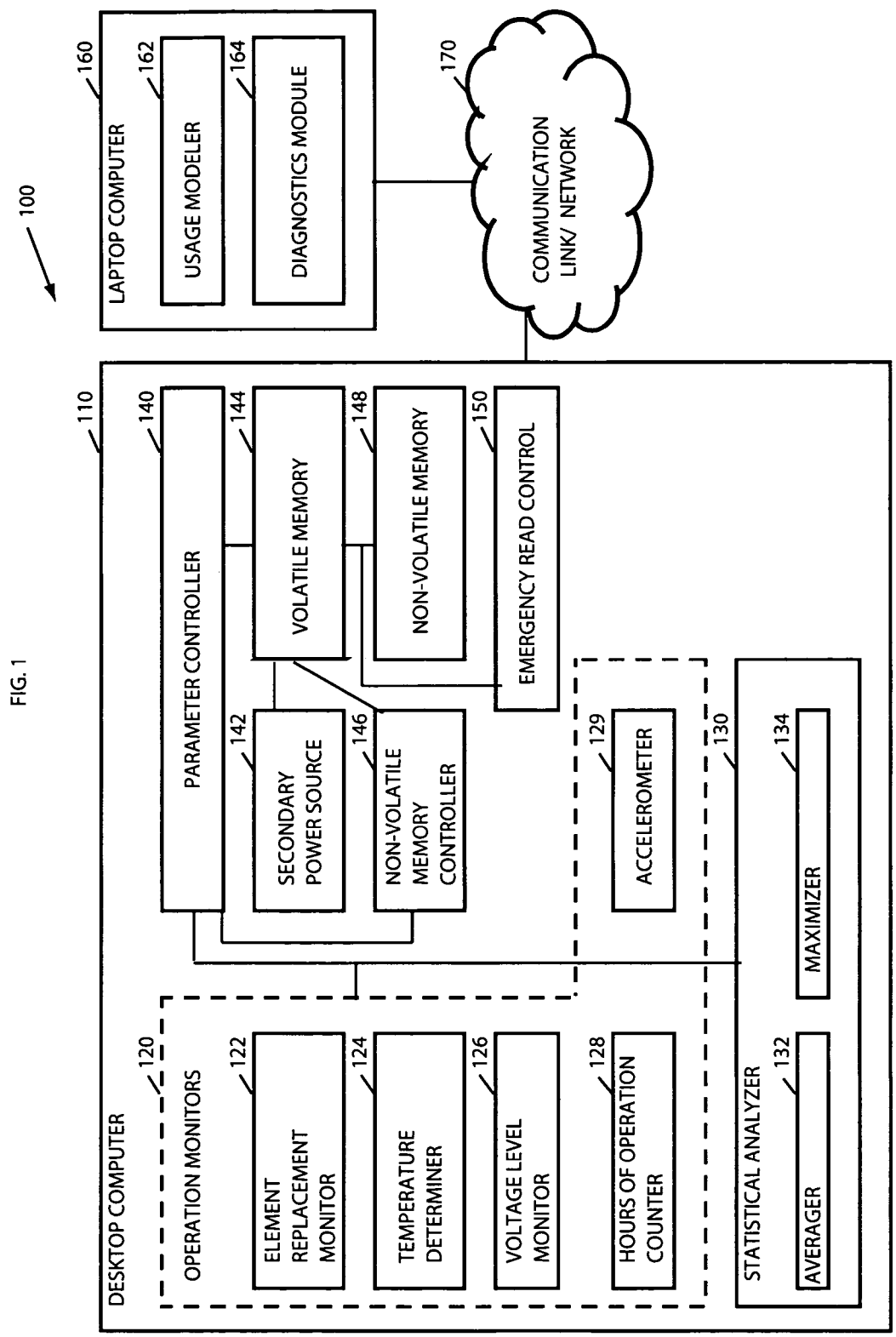
FIG. 1 depicts an embodiment of a system having a desktop computer with a non-volatile and volatile memory to maintain operation parameters until collected for processing by a laptop computer.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements for capturing information related to operational conditions prior to a failure of a processing device are contemplated. Embodiments include volatile memory to quickly record operational parameters via, e.g., basic input-output system (BIOS) code, system management interrupt (SMI) code and/or executing applications during normal operation. Many embodiments provide a secondary power source to protect against loss of the information between storage in the volatile memory and storage in the non-volatile memory. Further embodiments include a read controller that provides access to the volatile memory when primary power is available, advantageously protecting the non-volatile memory from excessive accesses to avoid premature wear-out. For instance, non-volatile memory generally has a lifetime max of 100,000 writes so writing to the non-volatile memory every 32 seconds would wear-out the memory in less than six months.

In several embodiments, the read controller may also offer direct access to the non-volatile memory in case of a catastrophic failure that renders the processing device substantially non-functional. A second processing device may access the operational parameters via the read controller to generate a usage model and/or to perform diagnostics to determine the cause of the failure. Advantageously, the information captured is selected based upon relevance to the usage model and/or diagnostics. The information is also accurate and consistent, facilitating easy and quick comparison with other, similar failures with comparable models of the processing device. Further, the information may be uploaded to second processing device, e.g., via the Internet during a telephone conversation with the technician, or via a direct communication link when the technician is in the same physical location as the faulty processing device.

In many embodiments, the information may be uploaded even in the event of a substantially complete failure of the processing device. The technician, via the communications link, can issue a command to either allow access through the communications link to the information or to cause the information to be uploaded to the technician's computer or data storage device.

While specific embodiments will be described below with reference to particular configurations of volatile memory and non-volatile memory, those of skill in the art will realize that embodiments of the present invention may advantageously be implemented with other substantially equivalent circuit configurations and elements.

Turning now to the drawings, FIG. 1 depicts an embodiment of a system 100 having a desktop computer 110 with a volatile memory (VM) 144 and a non-volatile memory (NVM) 148 to maintain operational parameters that describe usage, environmental conditions, and other conditions related to the operation of desktop computer 110 until collected for processing by a laptop computer 160. Several embodiments include functionality to limit accesses such as writes to NVM 148 to extend the life of the NVM 148 to a life expectancy near the designed life expectancy for system 100. In other embodiments, the life of the NVM 148 may be extended in other ways such as providing a plurality of separate NVMs that may be alternatively used to store the operational parameters. Further embodiments may have higher priorities than the life expectancy of the NVMs.

Desktop computer 110 includes operation monitors 120, a statistical analyzer 130, a parameter controller 140, VM 144, NVM control 146, NVM 148, and emergency read control 150. Operation monitors 120 are illustrated as a functional unit in dashed lines for ease of discussion but the individual monitors may be independent devices that are dispersed throughout the chassis and/or components of system 100 and/or are integrated with other devices of system 100. Operation monitors 120 include instruments to detect environmental conditions and/or operations performed by system 100, or one or more components thereof. The data collected from operation monitors 120 may then be stored in NVM 148 as individual operational parameters and/or combined in some manner to determine a collective operational parameter. For example, operation monitors 120 may include interior and/or exterior temperature measurement devices to monitor the ambient temperatures to which system 100 is subjected. Advantageously, the exterior temperatures may identify environmental conditions out of the range specified for system 100, reducing the investigation into such early life failures and/or helping to re-define the specifications to which systems such as system 100 are being manufactured.

Further, operational parameters that indicate the exterior temperature and interior temperature may identify a failure of proper ventilation and, in embodiments that monitor interior temperatures in more than one location, proper and improper airflows. A pattern of improper airflows in multiple systems 100 may indicate a problem with a design and/or manufacturing process for the system 100. Moreover, comparison of the, e.g., airflows from field-tested systems 100 and a prototype system 100 may identify whether the problems with airflow result from the design or the manufacturing process.

Operation monitors 120 are devices that monitor and collect information about some aspect of the actual use, operation, events during use, and maintenance of system 100. The number of and types of operation monitors 120 that are incorporated into system 100 may depend upon the uses for which system 100 is designed, the types of optional equipment incorporated into system 100, and/or other considerations. In the present embodiment, operation monitors 120 may, for instance, include devices such as an element replacement monitor 122, a temperature determiner 124, a voltage level monitor 126, an hours of operation counter 128, an accelerometer 129, and/or other types of sensors, detectors, counters, and the like. The element replacement monitor 122, for example, may track replacements of hardware such as memory, hard disk drives (HDDs), processors, etc. The voltage level monitor 126 may monitor one or more voltage levels throughout system 100 for over voltages and under voltages. The hours of operation counter 128 may track time elapsed while system 100 is fully powered on and/or when system 100 is in one or modes such as a standby mode or a deep sleep mode. And, accelerometer 129 may generate an indication that system 100, or one or more components thereof, have been subjected to an abrupt acceleration.

Data may be harvested from the operation monitors 120 via, e.g., basic input-output system (BIOS) code, system management interrupt (SMI) code and/or executing applications. For example, SMI code may periodically generate interrupts to update operational parameters stored in NVM 148. In other embodiments, an application such as an operating system may take advantage of the operational parameter storage by determining and storing operational parameters in VM 144.

Statistical analyzer 130 may analyze data harvested from operation monitors 120 to determine operational parameters. In particular, statistical analyzer 130 may include an averager 132 and a maximizer 134. Averager 132 may collect data from operation monitors 120 and generate an operational parameter based upon an average of multiple readings from one or more of the monitors. In some embodiments, statistical data collection other than average and maximum may be implemented. For example, averager 132 may collect reading from temperature determiner 124 and generate an average temperature from a specific interior location of system 100 and/or generate an average temperature across more than one interior location of system 100. Similarly, maximizer 134 may receive multiple reading from one or more specific monitors and generate one or more operational parameters to describe maximum readings. Further, statistical analyzer 130 may maintain information correlating, e.g., specific events and measurements.

In further embodiments, statistical analyzer 130 may be designed to identify emergency conditions based upon the operational parameters and/or other conditions monitored by operation monitors 120. Emergency conditions may include high voltages, high temperatures, fan or ventilation failures, abrupt accelerations, etc. If statistical analyzer 130 detects an emergency condition, an emergency write may be made to NVM 148 to save operational parameters most recently recorded in VM 144. For example, statistical analyzer 130 may recognize a continuous high temperature on a processor of desktop computer 110 or a sharp acceleration indicating that the desktop computer 110 may be falling.

Parameter controller 140 may collect operation parameters from operation monitors 120 and/or statistical analyzer 130 and store the operation parameters in VM 144. In many embodiments, parameter controller 140 may also track the time between stores from VM 144 to NVM 148, generating a signal to indicate that the contents of VM 144 should be transferred to NVM 148. For instance, parameter controller 140 may include standby timers to transmit operation parameters to VM 144 at regular timed intervals. In such embodiments, NVM controller 146 may approve requests to transfer the contents of VM 144 to NVM 148 unless NVM controller 146 detects a problem or error related to the requests. For instance, NVM controller 146 may check the timing of a request for access to NVM 148 in response to receipt of such as request from parameter controller 140. For example, NVM controller 146 may log accesses and be designed to prevent more than one access per day unless an emergency situation exists. In case of an emergency condition, NVM controller 146 may limit accesses to NVM 148 to a total of two accesses per day. Thus, if parameter controller 140, for any reason, requests more than one access without an emergency or more than two accesses with an indication of an emergency, NVM controller 146 may prevent the excess accesses. Advantageously, the life of NVM 148, being inherently limited in many embodiments, can be preserved, e.g., for anticipated life of system 100.

VM 144 may include a random access memory (RAM) buffer capable of fast stores relative to NVM 148. In some embodiments, VM 144 may include cache for even faster access by attenuating delays resulting from refresh cycles. In many embodiments, VM 144 couples with more than one power source such as a primary power source generally available to system 100 when a power switch of system 100 is turned on, a standby power source, and a secondary power source 142. VM 144 may receive power from the standby power source in the event of problems with the primary power source that do not affect the standby source. VM 144 may couple with secondary power source 142 via a switch that senses the voltage level of the primary or standby voltage and switches power sources from the primary voltage source and standby voltage source to a secondary power source 142 in response to a significant change in the voltage. In other embodiments, other arrangements of alternate power sources may be implemented. In some embodiments, for example, no alternate power source may be incorporated into system 100.

Secondary power source 142 may be, for instance, a battery pack or a capacitor bank designed to provide sufficient power to maintain the contents of VM 144 while the contents are being transferred to NVM 148. NVM 148 may include memory or storage such as flash memory, electrically eraseable programmable read only memory (EEPROM), magnetic RAM (MRAM), ferroelectric RAM (FeRAM), or the like.

Emergency read control 150 may facilitate transference of the operational parameters stored in NVM 148 via a serial port in case of a catastrophic failure that renders system 100 substantially non-functional, i.e., preventing access of operational parameters via the remainder of system 100. In particular, emergency read control 150 may populate a general-purpose input-output (GPIO), or any device capable of inputting and outputting data and/or communicating with possibly other flexible uses, to transmit the operational parameters to laptop 160 via communication link/network 170. In some embodiments, the operational parameters may be read from either VM 144 and/or NVM 148 when system 100 is not operational. And, in some such embodiments, access to operational parameters in VM 144 or NVM 148 via emergency read control 150 may only be available when system 100 is substantially inoperable.

Communication link/network 170 is a network connection to couple emergency read control 150 with laptop 160 to transmit operational parameters from desktop computer 110. In some embodiments, communication link/network 170 may include a network in an office coupled via Ethernet, optical media like OptiConnect, or the like. In several embodiments, communication link/network 170 also couples with the Internet via a cable modem, a digital subscriber line (DSL), a T1 line, a T3 line, or the like. In further embodiments, communication link/network 170 may include a direct physical link such as a wire or optical fiber. In other embodiments, communication link/network 170 may include a network of temporary connections such as connections via a telephone system Laptop computer 170 may be a computer operated by a technician and being utilized to analyze operational parameters of desktop computer 110. Analysis of the operational parameters may determine a usage model and/or diagnose a re-occurring or persistent failure. Laptop computer 170 may include a usage modeler 162 and a diagnostics module 164. Usage modeler 162 may generate a model of usage by the particular customer based upon the operational parameters retrieved from NVM 148. Diagnostics module 164 may analyze the operational parameters to detect problems in light of expected operational parameters and/or to diagnose a failure in response to a customer's inquiry.

Although laptop computer 170 and desktop computer 110 may be illustrated a specific portable and stationary processing devices in the present embodiment, they may, in other embodiments, be any combination of processing devices such as workstations, servers, personal digital assistants (PDAs), or the like.

Figure 2:
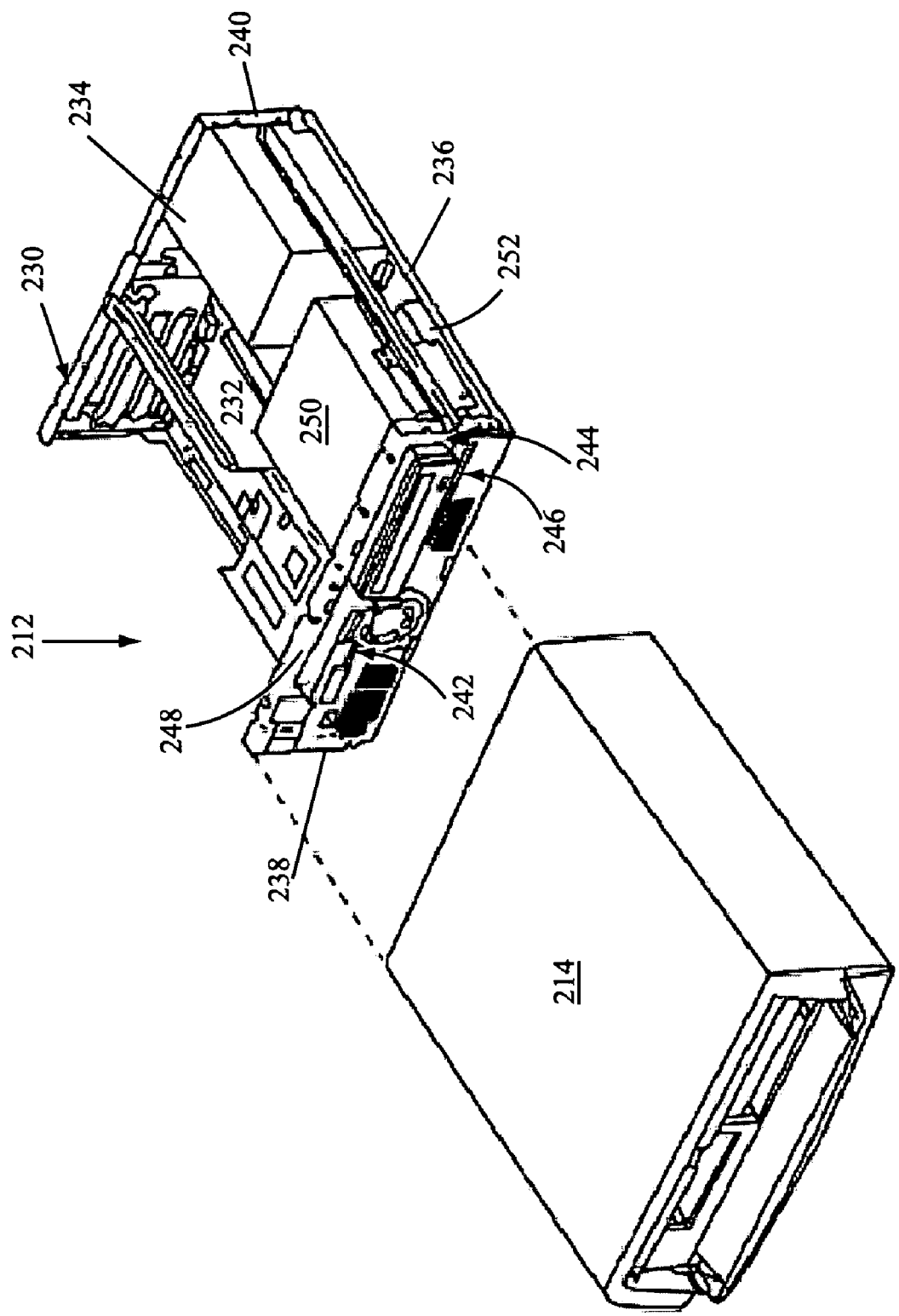
FIG. 2 depicts an exploded perspective view of certain elements of a processing device such as the desktop computer in FIG. 1, including a chassis, a cover, and a planar board.

FIG. 2 depicts an exploded perspective view of certain elements of a personal computer 212 such as the desktop computer in FIG. 1, including a chassis 230, a cover 214, and a planar board 232. Cover 214 is a decorative outer member that cooperates with a chassis 230 in defining an enclosed, shielded interior volume for receiving electrically powered data processing and storage components to process and store digital data. At least certain of these components are mounted on a multi-layer planar 232 or motherboard which is mounted on the chassis 230 and provides a means for electrically interconnecting the components of the personal computer 212 including those identified above and such other associated elements as floppy disk drives, various forms of direct access storage devices, accessory adapter cards or boards, and the like.

Personal computer 212 has a power supply 234 that may be actuated by a power switch (not shown). The chassis 230 has a base indicated at 236, a front panel indicated at 238, and a rear panel indicated at 240. The front panel 238 defines at least one open bay for receiving a data storage device such as a disk drive for magnetic or optical disks, a tape backup drive, or the like.

In the illustrated form, a pair of upper bays 242, 244 and a lower bay 246 are provided. One of the upper bays 242 is adapted to receive peripheral drives of a first size (such as those known as 3.5 inch drives) while the other 244 is adapted to receive drives of a different size (such as a CD-ROM or DVD-ROM drive) and the lower bay is adapted to receive another drive. One floppy disk drive indicated at 248 is a removable medium direct access storage device (DASD) capable of receiving a diskette inserted there into and using the diskette to receive, store and deliver data as is generally known. One CD-ROM drive indicated at 250 is a removable medium DASD capable of receiving a compact disc inserted there into and using the disc to deliver data as is generally known. One hard disk drive is indicated at 252 and is a fixed medium DASD capable of storing and delivering data as is generally known.

Figure 3:
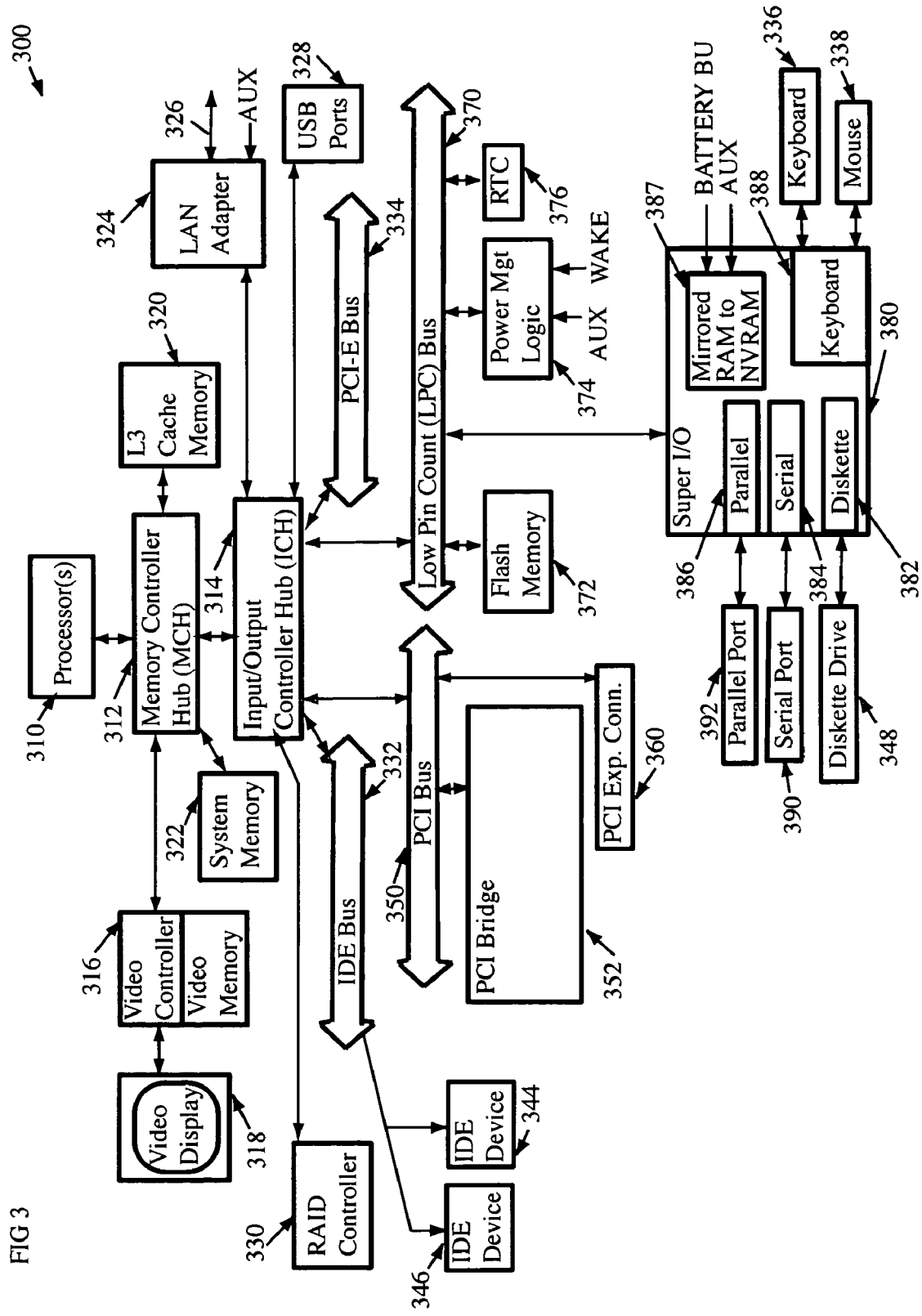
FIG. 3 depicts a block diagram of certain components of the processing device of FIG. 2.

Referring now to FIG. 3, there is shown a block diagram 300 of certain components of the personal computer 212 of FIG. 2. The components of FIG. 3 comprise components mounted on the planar 232 or other hardware of the personal computer 212. Connected to the planar 232 is the system CPUs or processor(s) 310, which is connected directly to a memory controller hub (MCH) 312. As one example, the system processor(s) 310 could be an Intel Pentium processor, Cyrix 586-P75 processor or Advanced Micro Devices 8486 processor or any other suitable processor.

MCH 312 and input-output (I/O) controller hub (ICH) 314 represent part of the personal computer's 212 core logic chipset, facilitating access to/from processor(s) 310 from/to memory devices and I/O devices, respectively. More specifically, MCH 312 provides access to system memory 322 and level three (L3) cache memory 320. In many such embodiments, level one (L1) and level two (L2) cache are incorporated into each processor of processor(s) 310.

MCH 312 may also include a special bus adapted for direct memory access (DMA) by a video controller. In some embodiments the special bus may be an accelerated graphics port (AGP). The AGP may be a high-speed port that is designed for the display adapter 316, a video card typically including a video controller and video memory. The AGP provides a direct connection between the card 316 and system memory 322. AGP may use, e.g., a 32-bit bus to provide data transfer rates such as 264 Megabytes per second, 528 Megabytes per second, one Gigabyte per second, and two Gigabytes per second. In other embodiments, a peripheral component interconnect (PCI) bus such as a PCI-E bus may be implemented for video display 318.

System memory 322 may include random access memory (RAM) such as double data rate (DDR) synchronous dynamic random access memory (SDRAM). System memory 322 is composed of one or more memory modules and MCH 312 includes a memory controller with logic for mapping addresses to and from processor(s) 310 to particular areas of system memory 322 and a cache controller operatively coupled with L3 cache memory 320.

ICH 314 is designed to coordinate communications with various I/O devices. In the present embodiment, ICH 314 couples with local area network (LAN) adapter 324, universal serial bus (USB) ports 328, Redundant array of independent disks (RAID) controller 330, integrated drive electronics (IDE) bus 332, PCI Express (PCI-E) bus 334, PCI bus 350, and low pin count (LPC) bus 370. LAN adapter 324 can be coupled to either the PCI bus 350 or directly to ICH 314 to facilitate communication (i.e., transmit/receive data) with a remote computer or server over a LAN via a connection or link 326. LAN adapter 324 may be a card to be plugged in personal computer 212 or a LAN connection embedded on the planar 232. LAN adapter 324 may also be known as a network interface card (NIC).

LAN adapter 324 may include a Media Access Controller (MAC), which serves as an interface between a shared data path (e.g., a media independent interface as described below) and the ICH 314. The MAC performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception. The MAC can be, for example, an Intel 82557 chip.

LAN adapter 324 further comprises a physical layer and a media independent interface (MII), which is a local bus between the MAC and the physical layer. The MII is a specification of signals and protocols, which formalizes the interfacing of a 10/100/1000 Mbps Ethernet MAC, for example, to the underlying physical layer. The physical layer receives parallel data from the MII local bus and converts it to serial data for transmission over link 326. The physical layer may be, for example, an Integrated Circuits Systems 1890 chip. The physical layer includes auto-negotiation logic that, in one embodiment, determines the capabilities of a server, advertises its own capabilities to the server, and establishes a connection with the server using the highest performance common connection technology. In the present embodiment, personal computer 212 also includes wake-on-LAN functionality incorporated into LAN adapter 324.

USB ports 328 are hardware interfaces for peripherals such as the keyboard, mouse, joystick, scanner, printer, telephony devices, hard drives, compact disk (CD) drives, digital video disk (DVD) drives, and the like. USB ports 328 also typically support MPEG-1 and MPEG-2 digital video. A USB 1.1 protocol for USB ports 328 has a maximum bandwidth of 12 Megabits per second (equivalent to 1.5 Megabytes per second), and up to 127 devices can be attached. Fast devices can use the full bandwidth, while lower-speed ones can transfer data using a 1.5 Megabits per second subchannel. A USB 2.0 protocol, widely known as Hi-Speed USB, dramatically increases capacity to 480 Megabits per second. Further, USB ports 328 support hot swapping, which allows peripherals to be plugged in and unplugged without turning the system off.

RAID controller 330 is a controller for a disk subsystem that is used to increase performance or provide fault tolerance. More specifically, RAID controller 330 couples with a set of two or more ordinary hard disks and improves performance by disk striping, which interleaves bytes or groups of bytes across multiple drives, so more than one disk is reading and writing simultaneously. RAID controller 330 adds fault tolerance by mirroring or parity. Mirroring is 100% duplication of the data on two drives (RAID 1), and parity is used (RAID 3 and 5) to calculate the data in two drives and store the results on a third: a bit from drive 1 is XOR'd with a bit from drive 2, and the result bit is stored on drive 3. A failed drive can be hot swapped with a new one, and the RAID controller automatically rebuilds the lost data from backups maintained on other drives. In addition, RAID systems may be built using a spare drive (hot spare) ready and waiting to be the replacement for a drive that fails.

IDE bus 332 and PCI-E bus 334 may be incorporated to facilitate connection of additional I/O devices with ICH 314. IDE bus 332 is a type of hardware interface widely used to connect hard disks, CD-ROMs and tape drives to a PC. IDE bus 332 provides for the attachment for hard disk drive 344 and CD-ROM drive 346.

PCI-E bus 334 is a high-speed peripheral interconnect. PCI-E bus is designed to match the higher speeds of CPUs and can accommodate Gigabit and 10 Gigabit Ethernet and even support chip-to-chip transfers. Rather than the shared, parallel bus structure of PCI, PCI-E bus 334 provides a high-speed, switched architecture. Each PCI Express link is a serial communications channel made up of two differential wire pairs that provide 2.5 Gigabits per second in each direction. Up to 32 of these "lanes" may be combined in x2, x4, x8, x16 and x32 configurations, creating a parallel interface of independently controlled serial links. The bandwidth of the switch backplane determines the total capacity of PCI-E bus 334.

PCI bus 350 may couple a PCI bridge 352 to facilitate the connection of additional PCI devices and a PCI expansion connector 360 to facilitate expansion of the PCI bus 350 so even more peripheral devices can communicate with ICH 314 via PCI bus compatible peripheral cards.

Attached to the LPC 370 is a flash memory (FM) module or chip 372, a power management logic 374, and a real-time clock (RTC) 376, and a multi-function or super I/O controller 380. Flash memory module 372 contains microcode that personal computer 212 will execute on power on. The flash memory 372 is a non-volatile memory module or chip.

Power management logic 374 is for changing the personal computer 212 between various power states (e.g., off, suspend and normal operating states). The circuitry is supplied with auxiliary power (AUX), or standby power, from the power supply 234 (as shown in FIG. 2) when the personal computer 212 is in the off state so that it can monitor events that cause the personal computer 212 to turn on. For example, the circuitry may also include a timer that is configurable by a user to expire after a predetermined period of time, often referred to as a time to power on function. When the timer expires, the circuitry such as a service processor may cause the personal computer 212 to change from the off state to the normal operating state.

The real-time clock (RTC) 376 is used for time of day calculations and for transferring operational parameters between VM and NVM of mirrored RAM to NVRAM 387 and for harvesting operational parameters from operational monitors of personal computer 212 and storing the operational parameters in mirrored RAM to NVRAM 387. That is, the NVRAM will contain values that describe the present configuration of the personal computer 212. For example, NVRAM such as flash memory 372 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Super I/O controller 380 may include functionality such as, for example, a National Semiconductor PC87307, as well as a mirrored RAM to NVRAM 387. The super I/O controller 380 contains a variety of I/O adapters and other components such as the diskette adapter 382, serial adapter 384, a parallel adapter 386 and keyboard controller 388. The diskette adapter 382 provides the interface to the diskette drive 348. The serial adapter 384 has an external port connector, serial port 390, for attachment of external devices such as modems (not shown). The parallel adapter 386 has an external port connector, parallel port 392, for attachment of external devices such as printers (not shown). The keyboard controller 388 is the interface for the connectors, keyboard 336 and mouse 338.

Figure 4:
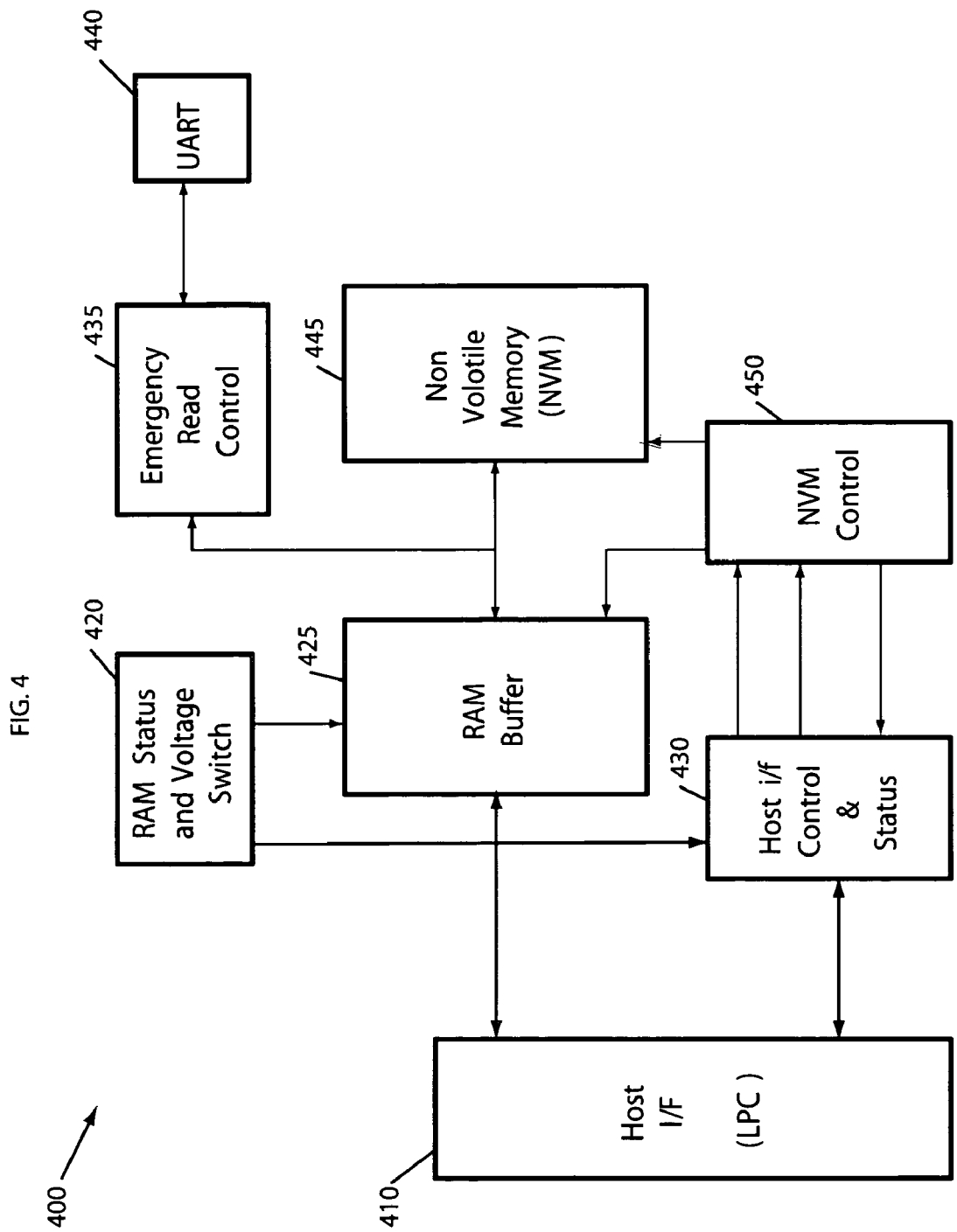
FIG. 4 depicts an embodiment of an apparatus for very fast access to the logging area to avoid causing systems problems.

Mirrored RAM to NVRAM 387 may advantageously provide cost-effective functionality for fast storage of operational parameters in a battery-backed RAM buffer and then in a NVRAM such as apparatus 400 described in conjunction with in FIG. 4. In many embodiments mirrored RAM to NVRAM 387 includes a voltage switch coupled with the primary power supply, standby power supply (AUX), and battery backup power supply for personal computer 212. The voltage switch may supply standby power to the RAM buffer in response to a failure of, loss of, or significant fluctuation in the power provided by the primary power supply. For situations in which both the primary and standby power fails, the voltage switch supplies the RAM buffer with power from the battery backup.

Mirrored RAM to NVRAM 387 may receive operational parameters from operation monitors, such as operation monitors 120 discussed in conjunction with FIG. 1. The operational parameters may be transmitted via LPC bus 370 or via another connection with super I/O 387. In some embodiments, for instance, super I/O 387 may have one or more embedded operation monitors such as a resistive temperature device (RTD) that provides an ambient temperature for the interior volume of personal computer 212. Further embodiments may include temperature measurement systems utilizing diodes or the like rather than resistive devices. Processor(s) 310 may also include or be coupled with an RTD or other temperature measurement device to monitor the temperature of processor(s) 310. IDE devices 344 and 346 may include operation monitors such as accelerometers to detect and attenuate damage to, e.g., a hard disk drive and a CD ROM drive, which results from a sharp acceleration and/or deceleration of personal computer 212. Further, temperature measurement and airflow measurement devices may be dispersed in various locations inside and outside the interior volume defined by cover 214 and chassis 230.

FIG. 4 depicts an embodiment of an apparatus 400 for cost-effective, fast access to the logging area to avoid causing system problems. Apparatus 400 may be a subsystem of a system, or processing device, such as a desktop computer, a laptop computer, a personal digital assistant, or other processor based device. A host interface (I/F) 410 may store operational parameters for the system in a VM, RAM buffer 425, quickly, and dump the contents of RAM buffer 425 into NVM 445 with a limited number of accesses to provide storage substantially unaffected by power loss. More specifically, apparatus 400 includes host I/F 410, a RAM status and voltage switch 420, RAM buffer 425, host I/F control and status 430, NVM 445, an NVM control 450, an emergency read control 435 and a universal asynchronous receiver transmitter (UART) 440.

Host I/F 410 maybe a low pin count (LPC) bus interface designed to read from and write to RAM buffer 425 and host I/F control and status 430. In particular, host I/F 410 reads from RAM buffer 425 to determine whether an operational parameter may be written to an address in RAM buffer 425 and writes the operational parameter to the address if available. For instance, when ready to reset a count of a particular summarized operational parameter, host I/F 410 may read the content of RAM buffer 425 to determine whether the content corresponding to that summarized operational parameter has been written to NVM 445. If the operational parameter has already been written to NVM 445 then host I/F 410 proceeds to write over the prior content. On the other hand, if the operational parameter has not been written to NVM 445, host I/F 410 may determine that the contents of RAM buffer 425 still maintains information to be written to NVM 445. Host I/F 410 may also determine that sufficient time has elapsed to allow an access to NVM 445 to synchronize the contents of RAM buffer 425 with NVM 445 and may signal host I/F control and status 430 to indicate that the contents of RAM buffer 425 should be stored in NVM 445.

In some embodiments, host I/F 410 may determine whether sufficient time has elapsed since the last access of NVM 445. In other embodiments, the timing for dumping the contents of RAM buffer 425 into NVM 445 may be based upon a timer or substantially similar device. For example, as a mechanism for protecting the life of NVM 445, a timer may be set to count down six hours between accesses for recording the contents of RAM buffer 425 into NVM 445. Once the timer counts down to zero, host I/F 410 may change a write status bit in host I/F control and status 430 to indicate that the operational parameters in RAM buffer 425 should be written to NVM 445.

RAM status and voltage switch 420 is designed to maintain power for the RAM buffer 425 to avoid losing operational parameters stored in RAM buffer 425 before the parameters are transferred to NVM 445. In several embodiments, RAM status and voltage switch 420 switches to standby power in the case of a disruption or failure of primary power and switches to a battery backup power supply or a capacitor bank in the case of a power loss of both the primary power and the standby power sources. For instance, the primary power source may remain on as long as a computer remains turned on. When the power is turned off, the standby power may still be power drawn from the alternating current (AC) power source. However, if the computer is unplugged, both the primary power source and the standby power source are lost so the voltage switch switches to a battery backup power supply. Further, any information stored in RAM buffer is likely the latest data prior to the failure so the information is possibly important for, e.g., diagnosing a failure of the computer and/or building a usage model for that particular user. For example, ten minutes prior to host I/F 410 determining that the operational parameters in RAM buffer 425 should be synchronized with the contents of NVM 445, the customer may turn off the computer. RAM status and voltage switch 420 switches the power supply for RAM buffer 425 to standby power. Then, the customer unplugs the computer to move the computer to another station and, in response, RAM status and voltage switch 420 switches to the battery backup.

NVM control 450 may protect the life of NVM 445 by limiting a number of accesses to NVM 445. For instance, NVM control 450 may receive a signal indicating a change in the write bit to determine whether host I/F 410 indicated that the contents of RAM buffer 425 should be written to NVM 445. In further embodiments, host I/F 410 may check the content of the write bit periodically or occasionally.

In response to an indication that sufficient time has passed since the last time NVM 445 was accessed from host I/F 410, NVM control 450 determines whether sufficient time has passed since the last access to NVM 445 to allow another access. If sufficient time has passed, NVM control 450 instructs NVM 445 to copy the contents of or synchronize with the contents of RAM buffer 425.

On the other hand, if an emergency situation occurs, host I/F 410 may write to an emergency write bit, or alert bit, in addition to the RAM-to-NVM sync bit before sufficient time has passed for a normal access of NVM 445. NVM control 450 may receive a signal indicating that it should allow NVM 445 to sync with RAM buffer 425 from host I/F 410. Then, NVM control 450 independently determines whether an access to NVM 445 should be allowed. Upon determining that a normal access to NVM 445 should not be allowed, NVM control 450 may check the emergency write bit to determine whether an emergency situation has arose, according to host I/F 410. In an emergency situation, a limited number of additional accesses may be acceptable, so the normal access protection may be overridden. In response to determining that the emergency write bit is set, NVM control 450 signals NVM 445 to sync with RAM buffer 425. Advantageously, by utilizing the emergency write bit, operational parameters may be captured from RAM buffer 425 up until very close to the moment that the processing device fails.

In further embodiments, NVM control 450, and potentially other hardware and/or software components of apparatus 400, may provide a burnout protection to protect against damage of NVM 450 from excessive accesses. A virus or hacker may, for instance, attempt to cause excessive writes to NVM 445 so NVM control 450 is designed to double-check not only normal, periodic stores to NVM 445, but also emergency overrides determined by host I/F 410 to limit accesses to NVM 445 and therefore, prevent premature wear-out. For example, if someone tries to hack the computer and redefine the time period between accesses, e.g., causing host I/F 410 to request a write from RAM buffer 425 to NVM 445 every 30 seconds in an attempt to burn out NVM 445, NVM control 450 may recognize the excessive number of accesses and advantageously ignore the instructions from the host I/F 410 to access NVM 445. Other hardware and/or software components of apparatus 400, or of the system encompassing apparatus 400, may either prevent the request for the excessive accesses or signal NVM control 450 that the excessive accesses should be ignored or prevented. Further, the system encompassing apparatus 400 may be notified of the violation by NVM control 450 and/or the other hardware and/or software components of apparatus 400.

In other embodiments, NVM control 450 may control period stores to NVM 445 without instruction from host I/F 410. For example, upon determining that sufficient time has elapsed from the last access to copy the contents of RAM buffer 425 into NVM 445, NVM control 450 may either copy the contents of RAM buffer 425 that are not being accessed, not marked as invalid, or may wait to copy until the contents of RAM buffer 425 are not being accessed by host I/F 410.

In a further embodiment, NVM control 450 may load the contents of NVM 445 into RAM buffer 425 if the contents of RAM buffer 425 become corrupted. In particular, NVM control 450 may be designed to receive an indication from host I/F 410 to indicate that, e.g., a power failure of both primary power and the battery backup power corrupted the contents of RAM buffer 425. In another embodiment, NVM control 450 may check the integrity of RAM buffer 420 via a status indication of RAM status and voltage switch 420.

NVM control 450 may also include logic to allow a write to NVM 445 only when the contents of NVM 445 have changed. In some embodiments, NVM control 450 may allow changed data to be written to NVM 445, advantageously extending the life of NVM 445. For example, one entry in RAM buffer 425 may include the highest temperature to which apparatus 400 has been exposed. When that temperature is not exceeded between writes to NVM 445, the temperature value in that entry will not change. Thus, NVM control 450 may prevent that entry from being written to NVM 445. In several such embodiments, a flag may be set next to each entry that changes between writes to NVM 445 and then all the flags are cleared upon writing the entries to NVM 445. NVM control 450 can thus determine whether an entry has been changed by reviewing the flag associated with the entry.

Emergency read control 435 is designed to facilitate transfer of operational parameters from the processing device in case of a catastrophic failure that prevents access to the RAM buffer 425 and/or NVM 445 via host I/F 410. Emergency read control 435 facilitates transference of the operational parameters out a serial port via UART 440. For example, if a processing device is received in a refurbish/repair center and the processing device does not function sufficiently well to provide access to the operational parameters in NVM 445, then the technician can get the information out of NVM 445 via UART 440 to figure out what went wrong with the processing device.

In many embodiments, the operational parameters can be transferred from NVM 445. In further embodiments, the operational parameters may be transferred via RAM buffer 425. For instance, when the RAM buffer 425 retains valid operational parameters, RAM buffer 425 may be accessed instead of NVM 445. The integrity of the information in RAM buffer 425 may be validated based upon bits such as status bits for the data and/or start and stop bit sequences added to the information for the purpose of detecting corrupted data. In other embodiments, the contents of NVM 445 are copied into RAM buffer 425 and read out through UART 440 via RAM buffer 425.

UART 440 may include a command response protocol to facilitate access to the contents of RAM buffer 425 and/or NVM 445 in response to receipt of a command. For example, the contents of RAM buffer 425 and/or NVM 445 may be read when the appropriate command is provided in the incoming stream and a respective outgoing data stream is provided in response with the required data.

Some embodiments may include security measures allowing access to the contents of RAM buffer 425 and/or NVM 445 via UART 440 when proper authorization is provided. For instance, a password may be required before allowing access to RAM buffer 425 and/or NVM 445. In further embodiments, operation of UART 440 to access the contents of RAM buffer 425 and/or NVM 445 may be limited to situations in which other avenues of access to RAM buffer 425 and/or NVM 445 via apparatus 400 are not available or operational. For example, a bootstrap or other indication of activity by the host via host I/F 410 may determine if the contents of RAM buffer 425 and/or NVM 445 may be accessed, advantageously allowing UART 440 to be shared with other resources.

UART 440 may be an electronic circuit that makes up the serial port. UART 440 converts parallel bytes from the processor into serial bits for transmission, and vice versa. UART 440 generates and strips the start and stop bits appended to each character. In other embodiments, different I/O interfaces may be used in place of UART 440 such as an Enhanced Parallel Port (EPP), an Enhanced Capabilities Port (ECP), a USB port, an Ethernet port, a Firewire port, a modem port, and/or any other I/O port.

FIG. 5 depicts an example of a flow chart 500 for capturing runtime information in a personal computing device such as desktop computer 110 shown in FIG. 1. Flow chart 500 begins with determining an operational parameter (element 510). For example, parameter controller 140 may receive or retrieve data describing an ambient exterior temperature for desktop computer 110. In other embodiments, more than one instantaneous temperatures may be transmitted to statistical analyzer 130 and averaged to determine an average ambient temperature. Then, parameter controller 140 may receive the averaged ambient temperature as an operational parameter and store the operational parameter in VM (element 515).

While collecting and storing operational parameters in VM, a voltage switch may monitor the voltage output of the primary power source being supplied to the VM. If a problem with the primary power source is detected (element 520), the voltage switch may provide power to the VM via an alternative power source (element 525). Advantageously, switching to the alternative power source can avoid loss of significant operational parameters stored in the VM immediately prior to an error or failure. On the other hand, if no problem is detected, the voltage switch may continue to supply power to the VM from the primary power source.

The parameter controller may then determine whether a timer, or substantially equivalent logic, expires, indicating that operational parameters stored in VM should be stored in NVM. If the timer does not expire, parameter controller may continue to determine and update parameters periodically (elements 510 and 515). However, if the timer does expire (element 530) then parameter controller may generate a signal to store a bit in a status register to indicate that the contents of VM should be copied or synchronized with the contents of NVM (element 535).

The NVM controller may recognize the change to the status bit and verify that sufficient time has elapsed to synchronize the contents of VM with the contents of NVM. Upon verifying the timing for transference of the contents from VM into NVM, the contents transfer. Otherwise, the status bit change is ignored (element 540). In some embodiments, the NVM controller may then signal an alert to indicate that an error has occurred.

Once the operational parameters of VM transfer into NVM, if there is a catastrophic failure (element 545), the contents of NVM may be accessed through an emergency read control to transfer the operational parameters to another processing device (element 550). Otherwise, the contents of NVM may be accessed through the processing device having NVM to transfer the operational parameters to a diagnostic module or usage modeler (element 555). In further embodiments, other methods of retrieving the operational parameters from memory may be implemented.

FIG. 6 depicts an example of a flow chart 600 for accessing operational parameters in a personal computing device such as desktop computer 110 shown in FIG. 1. Flow chart 600 begins with determining whether the input-output controller hub (ICH) is active (element 610). The activitiy or lack thereof determines whether operational parameters in VM and NVM can be accessed via a UART. More specifically, while the ICH is still active, the system is considered active so the data can likely be retrieved via the ICH. Thus, preventing access to operational parameters via the UART is a security precaution.

On the other hand, when the ICH is not active, the system may be considered in an emergency state for the purposes of retrieving operational parameters via the UART. Thus, access to the NVM and VM via UART is enabled (element 615). In particular, enabling UART may activate a command monitor on UART to watch for a command that provides access through the UART to the operational parameters in the VM and/or NVM.

Upon receiving a valid command for access to operational parameters (element 620), security logic may determine whether authorization requirements are turned on (element 625). If the authorization requirements are not turned on, receipt of the valid command is sufficient to provide access to the operational parameters so the operational parameters may be transmitted (element 640) to an external device such as a technician's computer. In some embodiments, the operational parameters may be uploaded by the logic to the external device. In other embodiments, the external device can perform one or more reads to obtain the operational parameters.

If authorization is required (element 625), authorization may require, e.g., a password to allow access to the operational parameters. For instance, a user may select an option to secure the operational parameters or the system's designer may set a password known by technicians and a settable flag is set to indicate that authorization is required. In some embodiments, the password may be static, selected by a designer or user. In other embodiments, the password dynamic, being calculate based upon the time of day, month, year, model number, serial number, and/or the like. Further, the password may be transmitted as part of the initial command to enable access to the operational parameters or in a separate transmission.

The password is then compared with the correct password. If the command, for instance, is determined to include the correct password (element 630), the operational parameters may then be accessed via the UART (element 640). After the password is determined to be the incorrect password, the access to the operational parameters may be denied (element 635) and the UART may be disabled. In some embodiments, receipt of a selected number of incorrect passwords may shutdown the UART access for a period of time as an additional security measure.

It will be apparent to those skilled in the art having the benefit of this disclosure that the present invention contemplates methods and arrangements for capturing information related to operational conditions of a processing device. It is understood that the form of the invention shown and described in the detailed description and the drawings are to be taken merely as examples. It is intended that the following claims be interpreted broadly to embrace all the variations of the example embodiments disclosed.

What is claimed is:

1. An apparatus for capturing operational parameters of a processing device, the apparatus comprising:
   an operation monitor comprising an element replacement monitor, a temperature determiner, a voltage level monitor, an hours of operation counter, or an accelerometer to determine operational parameters for the processing device;
   a non-volatile memory buffer to store the operational parameters;

a volatile memory buffer coupled with the non-volatile memory buffer to increase capture speed for the operational parameters;

a non-volatile memory controller to limit write operations to the non-volatile memory buffer by determining that sufficient time has elapsed to allow another access of the non-volatile memory buffer and to transferring the operational parameters from the volatile memory buffer to the non-volatile memory buffer in response to the determination; and a processor coupled with the volatile memory buffer.

2. The apparatus of claim 1, further comprising a voltage switch coupled with the volatile memory buffer to maintain the operational parameters in the volatile memory buffer in response to a loss of power from a primary power source.

3. The apparatus of claim 1, further comprising a status register to indicate that the operational parameters are stored in the volatile memory buffer and ready to be transferred into the non-volatile memory buffer.

4. The apparatus of claim 1, further comprising an emergency read controller being designed to transfer the operational parameters to a serial port for collection by another processing device.

5. The apparatus of claim 4, wherein the serial port comprises a UART.

6. The apparatus of claim 4, wherein the serial port is designed for use in response to a failure that renders the processing device substantially non-functional.

7. The apparatus of claim 4, wherein the emergency read control couples with the non-volatile memory buffer.

8. The apparatus of claim 4, wherein the emergency read control couples with the volatile memory buffer.

9. The apparatus of claim 1, further comprising a measurement device to provide operational parameters for storage in the non-volatile memory buffer.

10. The apparatus of claim 9, further comprising a statistical analyzer to analyze data provided by the measurement device to generate at least one of the operational parameters, which is a summary of the data.

11. The apparatus of claim 1, wherein the non-volatile memory controller limits write operations to the non-volatile memory buffer, wherein the non-volatile memory buffer is flash memory.

12. The apparatus of claim 1, wherein the non-volatile memory controller limits write operations to one normal write operation during a pre-defined normal time period and one emergency write operation during a pre-defined emergency time period.

13. A processing device comprising:
an operation monitor to determine operational parameters for the processing device, wherein the operation monitor comprises an element replacement monitor, a temperature determiner, a voltage level monitor, an hours of operation counter, or an accelerometer;

a non-volatile memory device to store the operational parameters, wherein the non-volatile memory device comprises a non-volatile memory controller to limit write operations to a non-volatile memory by determining that sufficient time has elapsed to allow another access of the non-volatile memory and to transfer the operational parameters from a volatile memory device to the non-volatile memory device in response to the determination;

the volatile memory device to receive the operational parameters and maintain the parameters for storage in the non-volatile memory device;

a parameter controller to transfer the operational parameters to the volatile memory device and to initiate a transfer of the operational parameters from the volatile memory device to the non-volatile memory device;

a processor coupled with the parameter controller; and a read controller coupled with the non-volatile memory device to transfer the operational parameters from the processing device.

14. The processing device of claim 13, further comprising a statistical analyzer coupled with the operation monitor to analyze data provided by the operation monitor to generate at least one of the operational parameters, which is a summary of the data.

15. The processing device of claim 13, wherein the operation monitor comprises an ambient temperature determiner to measure an ambient temperature associated with operation of the processing device.

16. The processing device of claim 15, wherein the operation monitor comprises a standby timer to transmit the ambient temperature to the volatile memory device in timed intervals.

17. The processing device of claim 13, wherein the non-volatile memory device comprises the non-volatile memory controller to limit write operations to the non-volatile memory, wherein the non-volatile memory comprises flash memory.

18. The processing device of claim 13, wherein the volatile memory device comprises a power switch to switch a source of power for a volatile memory buffer of the volatile memory device to from a primary power source to a secondary power source in response to a failure of the primary power source and to a battery backup in response to a failure of both the primary power source and the secondary power source.

19. The processing device of claim 13, wherein the read controller is designed to transfer operational parameters from the non-volatile memory device to another processing device.

20. A method for capturing operational parameters of a processing device, the method comprising:
determining an operational parameter, the operational parameter being related to usage of the processing device, wherein the determining the operational parameter comprises determining an indication of an element replacement, a temperature, a voltage level, hours of operation, or an acceleration;

transferring the operational parameter to a volatile memory;

generating a signal to indicate that the operational parameter is stored in the volatile memory;

determining that sufficient time has elapsed to allow another access of a non-volatile memory to limit writes to the non-volatile memory; and transferring the operational parameter from the volatile memory into the non-volatile memory in response to the signal and said determining that sufficient time has elapsed.

21. The method of claim 20, further comprising maintaining a power source for the volatile memory by switching to an alternative power source in response to a failure of a primary power source.

22. The method of claim 20, further comprising accessing the non-volatile memory to transfer the operational parameters to a port for retrieval by another processing device in response to a catastrophic failure of the processing device.

23. The method of claim 20, further comprising accessing the volatile memory to transfer the operational parameters to provide an alternative path for retrieval of the operational parameters by another processing device.

24. The method of claim 20, wherein determining the operational parameter comprises summarizing data provided by an operation monitor.

25. The method of claim 20, wherein determining the operational parameter comprises harvesting the operational parameter from operation monitors.

26. The method of claim 20, wherein transferring the operational parameter from the volatile memory comprises limiting writes to a flash memory.

* * * * *

UNITED STATES PATENT AND TRADEMARK OFFICE
CERTIFICATE OF CORRECTION

| | | |
|---|---|---|
| PATENT NO. | : 7,177,782 B2 | Page 1 of 1 |
| APPLICATION NO. | : 10/871848 | |
| DATED | : February 13, 2007 | |
| INVENTOR(S) | : Ohed Falik et al. | |

It is certified that error appears in the above-identified patent and that said Letters Patent is hereby corrected as shown below:

Claim 1, at Column _16_, line _61_ should be corrected as follows:

after "monitor" and before "an element", replace "comprising" with --that is--

Signed and Sealed this

Tenth Day of April, 2007

JON W. DUDAS
*Director of the United States Patent and Trademark Office*